Jan. 21, 1941.    R. BRANDT    2,229,166
PROCESS FOR REMOVING CARBONIC OXIDE FROM COMBUSTIBLE GASES
Filed April 14, 1938
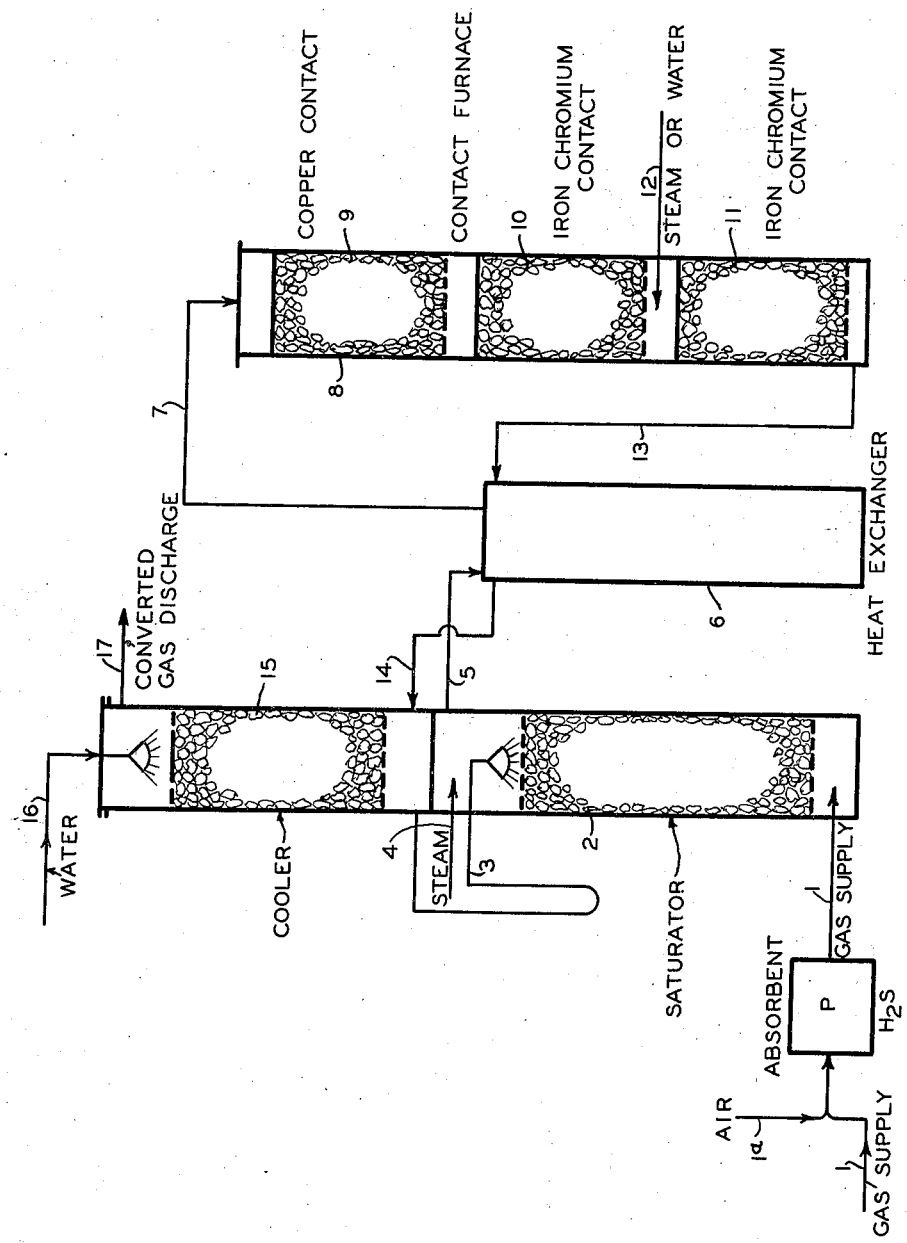
INVENTOR
Richard Brandt
BY  E. F. Wenderoth
ATTORNEY Patented Jan. 21, 1941

2,229,166

UNITED STATES PATENT OFFICE 2,229,166

PROCESS FOR REMOVING CARBONIC OXIDE FROM COMBUSTIBLE GASES

Richard Brandt, Berlin, Germany

Application April 14, 1938, Serial No. 202,130
In Germany November 19, 1935

4 Claims. (Cl. 23—3)

The removal of carbonic oxide from gases obtained from the distillation of coal or from gas mixtures containing gas obtained from the distillation of coal can, as is known, be effected by purifying the initial gas in the usual manner, and then, after addition of steam, subjecting it to so-called steam catalysis, for example, in the presence of an iron chromium contact. Associated with the stated usual purification there is also the removal of sulphuretted hydrogen. As a rule, however, organic sulphur compounds remain in the gas mixture and pass over the contact with the gas.

In the known method of removing carbonic oxide, difficulties have been experienced, because for the activity and duration of the contact, the presence of oxygen in the initial gas is of substantial consequence. The purification of the coal gas from sulphuretted hydrogen is, as is known, effected with iron purifying masses with the addition of air. As the simultaneous regeneration of the masses cannot be practically effected with a theoretical proportion of sulphuretted hydrogen to oxygen, after removal of the sulphuretted hydrogen the gas always contains a certain quantity of oxygen, as a rule about 0.2%.

The invention is based on the observation that such a content of oxygen is the cause of the rapid wastage of the iron chromium contact in consequence of the formation of resin-like products. The invention contemplates, therefore, the removal of the oxygen contained in the gas which has been freed from sulphuretted hydrogen in the usual manner. This is suitably effected by leading the gas mixture containing carbonic oxide, in which organic sulphur compounds may still be contained, before the conversion of the carbonic oxide by steam catalysis, over a preliminary contact of different composition from the main contact, which preliminary contact has such properties that the oxygen in the gas mixture is consumed. As the preliminary contact body there is preferably employed copper, but also other metals known for the removal of oxygen from gas mixtures, for example, from electrolytic hydrogen or for analytic determination in gas analysis, such as platinum, palladium, nickel, or metal oxide, come into consideration.

The method according to the invention can also be advantageously supplemented by preheating the fresh gas purified in the usual manner before the steam catalysis or conversion of the CO. It has been found that the generation of heat connected with the combustion of the oxygen can be very advantageously utilised to effect the preheating of the fresh gas for the steam catalysis. Consequently, in individual cases there may be incorporated in the gas a somewhat larger quantity of oxygen than is usual in the removal of the sulphuretted hydrogen. This has the advantage that the dry purification is conducted more economically, because the usual effective quantities per unit of volume of the purifying mass can be considerably increased.

It is true that there is already known a two-stage catalysis for the removal of carbonic oxide from gas mixtures, in which known method, however, in a first stage there is effected hydrogenation of carbonic oxide to form methane and in a second stage there is effected conversion of residual carbonic oxide to carbonic acid and hydrogen with the aid of the steam or water vapor obtained in the first stage. For this methane catalysis, however, notoriously crude gas or coal gas purified in the usual manner cannot be used, while, as regards its catalytic action for forming methane, the methane contact is poisoned by slight quantities of sulphur. Consequently, in the said known method the initial gas must be subjected to further thorough purification, especially from organically bound sulphur. In contrast therewith, it is an essential advantage of the method according to the invention that an initial gas containing organic sulphur compounds can be subjected to steam catalysis.

Such combustion of the oxygen at the preliminary contact has on the one hand the effect that the main contact is no longer damaged by the formation of noxious products and, consequently, has a longer life, while, on the other hand, an increase of temperature is obtained. If, for example, by preheating with the converted gas in a heat exchanger the fresh gas is brought to 290° C., then by the preliminary combustion, for example, a temperature of 350° C., can be obtained.

In order to be able to effect the temperature exchange with sufficient temperature drop, the temperature difference obtained by the exothermic conversion of carbonic oxide with water to form carbonic acid is further increased by the combustion of oxygen in the gas. To obtain a temperature drop between the converted gas and a fresh gas of 60 to 100° C., with the use of coal gas containing 6 to 7% of carbonic oxide, in view of the unavoidable heat radiation, for example, the additional combustion of 0.2 to 0.6 volume per cent of oxygen is necessary. The oxygen content is thus regulated in correspondence with the desired preheating. It is no longer, as in the known method, an injurious but a desired constituent for the control of the economy.

In a preferred embodiment the additional preheating is effected between the saturation of the gas with steam and the treatment at the main contact, in this case the steam passes with the gas through the heat exchanger and is thus preheated.

The preheating of the fresh gas with the contact in a heat exchanger is not necessary in all cases. For example, there are frequently available at the gas works hot gases of a temperature of 400 to 500° C., which can be used for heating. In such a case it is not necessary to introduce to the fresh gas a supplemental excess of oxygen, but there is obtained in consequence of the heating with the hot gases the same temperature relations if at the preliminary contact there is consumed only the quantity of oxygen which in itself is necessitated by the dry purification.

The converted gas is suitably subjected to a further preparatory treatment before it is led to the distribution main. For example, there may be effected more or less complete removal of sulphuretted hydrogen, of benzol, hydrocarbons, carbonic acid, moisture and other constituents such as ethylene, for which assistant materials and methods of operation are already known per se.

The copper-containing preliminary contact may be obtained, for example, by saturating pumice with copper nitrate, evaporating the nitrogen oxides and reduction of the copper oxide.

A flow diagram illustrating, more particularly, the following exemplary embodiment of the invention, is shown on the accompanying sheet of drawings.

Example

Coal gas containing benzol with 6.5% CO and of otherwise usual composition is freed from $H_2S$ in known manner with iron purifying masses by passing the same, as it comes through conduit, from the source of supply through a purifier P, air or oxygen being added for example at Ia in such excess that there results a gas with 0.4 vol. % oxygen. As shown on the said flow diagram, this gas is supplied through conduit I to a saturator 2 where it is saturated with 350 g. $H_2O$ per cubic meter, for example by spraying with hot water, entering the saturator at 3 and, if necessary, by direct contact with steam supplied through conduit 4. The gas, leaving the saturator 2 through conduit 5, is heated to about 300° C. in a heat exchanger 6. The resultant preheated gas-steam mixture flows from the heat exchanger 6 through conduit 7 to the top of contact furnace 8 and downwardly through the three sub-divisions 9, 10 and 11 of the latter. The first chamber 9 preferably contains a copper contact, while the second and third chambers contain a different contact, preferably an iron chromium contact. The gas-steam mixture preheated to 300°, flows first through the contact in chamber 9 whereby it is heated to about 360° C. as a result of the oxygen combustion which is stimulated by the copper contact. The gas-steam mixture then flows into chambers 10 and 11 wherein the steam reaction takes place and whereby the temperature of the reaction mixture is raised to about 400° C. By addition of steam or water of condensation through conduit 12 before entry of the mixture into chamber 11, the temperature of the reaction mixture can be moderated to 375° C. in order that the water-gas equilibrium may be adjusted in this chamber at this temperature. The reaction mixture leaves the contact furnace 8 at its lower end at approximately this same temperature and with a CO content of 0.5 to 0.8 vol. %, flows through conduit 13 into the heat exchanger 6 where the steam-saturated coal gas is heated to about 300°. The converted gas mixture flows from heat exchanger 6 through conduit 14 into cooler 15 wherein it is cooled by means of water supplied through conduit 16, finally leaving the cooler at 17 for further suitable treatment.

I claim:

1. A process for the removal of CO from gases comprising coal distillation products, which comprises passing the gases over a solid absorbent for impurities of the character of hydrogen sulphide and the like together with sufficient oxygen to revivify the said absorbent in situ and to leave a residual oxygen content of about 0.4% in the gases, incorporating steam into the said gases, preheating the resultant mixture to a temperature of about 300° C., passing the preheated mixture over a copper-containing contact at about 300° C. whereby catalytic combustion of the oxygen is effected and the temperature of the mixture is raised to about 360° C., adding steam to the resultant oxygen-free gases, and passing the resultant mixture over an iron-chromium contact at a temperature which will result in steam-catalysis and conversion of CO.

2. A process as defined in claim 1, the first step of adding steam being effected prior to the preheating to a temperature of about 300° C.

3. A process as defined in claim 1, the first step of adding steam being effected after the preheating to about 300° C.

4. A process as defined in claim 1, the first step of adding steam being effected after the preheating to a temperature of about 300° C. but before the subsequent heating to about 360° C.

RICHARD BRANDT.